United States Patent
Davani et al.

(10) Patent No.: US 6,865,625 B2
(45) Date of Patent: Mar. 8, 2005

(54) COMMUNICATION DEVICE WITH MULTI-LINE MESSAGE MEMORY ACCESS AND METHOD THEREFORE

(75) Inventors: Shouresh T. Davani, Boynton Beach, FL (US); Sandhya Chandarlapaty, Boynton Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 145 days.

(21) Appl. No.: 10/421,616

(22) Filed: Apr. 23, 2003

(65) Prior Publication Data

US 2004/0215845 A1 Oct. 28, 2004

(51) Int. Cl.[7] .......................... G06F 13/00; H04M 1/64
(52) U.S. Cl. .................... 710/36; 710/62; 379/67.1; 379/85; 379/88.13; 379/88.22
(58) Field of Search ............... 710/36, 62; 340/825.03, 340/2.1; 379/67.1, 70, 73, 85, 88.13, 88.22, 90.2; 455/73, 550.1, 557

(56) References Cited

U.S. PATENT DOCUMENTS

| | | | | |
|---|---|---|---|---|
| 5,014,296 A | * | 5/1991 | Saigano | 379/67.1 |
| 5,497,508 A | * | 3/1996 | George | 455/161.2 |
| 5,524,138 A | * | 6/1996 | Kawano | 379/88.28 |
| 6,473,496 B1 | * | 10/2002 | Mohageg | 379/90.01 |
| 2002/0127999 A1 | * | 9/2002 | Brown | 455/412 |

* cited by examiner

*Primary Examiner*—Ilwoo Park
(74) *Attorney, Agent, or Firm*—Randi L. Karpinia

(57) ABSTRACT

A communication device (100) includes a processor (130) for processing communications on more than one communication line and a multi-line message memory (200) including a memory storage location for each of the one or more communication lines. The communication device (100) operates using a message manager application (155) programmed to: operate using a first communication line as an active communication line, switch the active communication line to a second communication line, access a second memory storage location associated with the second communication line within the multi-line message memory, and switch the active communication line to the first communication line.

12 Claims, 4 Drawing Sheets

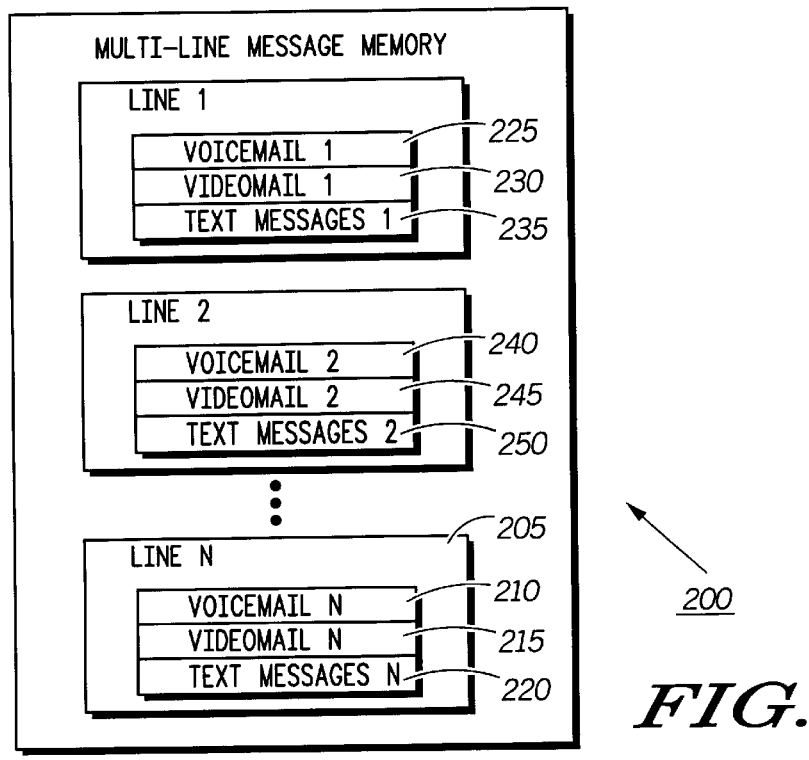
FIG. 2
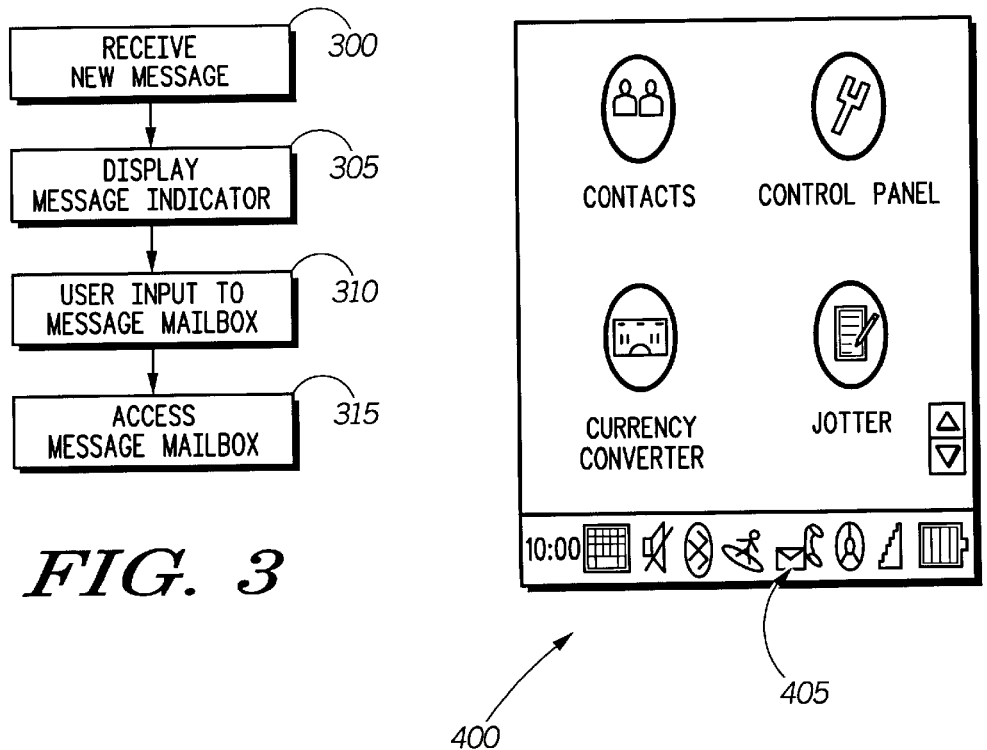
FIG. 3
FIG. 4

COMMUNICATION DEVICE WITH MULTI-LINE MESSAGE MEMORY ACCESS AND METHOD THEREFORE

BACKGROUND OF THE INVENTION

1. Field of the Invention

This invention relates in general to communication devices and more particularly to communication devices for use with multiple communication lines.

2. Description of the Related Art

Cellular telephones, messaging devices, PDAs (Personal Digital Assistants) and other portable electronic devices having communication capability have become fixtures of everyday life over the last several years. As they evolve, prices continue to fall while the devices' capabilities have expanded. Currently, such devices can be used in many places to make wireless connection to the Internet, play games, as well as carry out electronic mail and other messaging functions. It is anticipated that as time goes by, the capabilities of such devices will continue to expand as prices continue to fall, making use of such devices a permanent part of people's daily lives. Device manufacturers utilize technological innovations to carefully balance excitement and fun with convenience and simplicity of use.

Device customers are now relying on a single portable electronic device to provide communication capabilities where-ever they are located whenever they are needed. To facilitate this single device scenario, some device manufacturers are providing capability for multiple communication lines within a single communication device. For example, some wireless communication devices today offer alternate communication lines which enable the device to operate with two phone numbers, for example, one line for personal use and the other for business use. Some cellular telephones include "dual line registration" which is the ability to have two cellular telephone numbers in a single cellular telephone. The device user can set certain options such as the ring style and type of notification for calls on each individual line. The device user further can choose one of the two lines as the active line for outgoing calls.

Although portable communications devices are more accessible than fixed devices, there are still times when the device user is not able or available to answer a call. Message storage services provide a method for messages to be left for later retrieval. For example, voicemail provides electronic storage and transfer of audible messages. Similarly, video mail provides electronic storage and transfer of voice and motion video messages. Today's current communication devices with multiple lines provide individual message storage "mail boxes" for each line separately. To retrieve messages on each line, the user must manually change his active line prior to calling the voice mail number.

BRIEF DESCRIPTION OF THE DRAWINGS

The accompanying figures, where like reference numerals refer to identical or functionally similar elements throughout the separate views and which together with the detailed description below, are incorporated in and form part of the specification, serve to further illustrate various embodiments and to explain various principles and advantages all in accordance with the present invention.

FIG. 2 illustrates a message memory for use within the communication device of FIG. 1.

FIGS. 3 and 5 illustrate the operation of the communication device of FIG. 1.

FIGS. 4 and 6 through 11 illustrate various examples of a display for use within the communication device of FIG. 1.

DETAILED DESCRIPTION OF THE PREFERRED EMBODIMENT(S)

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Figure 1:
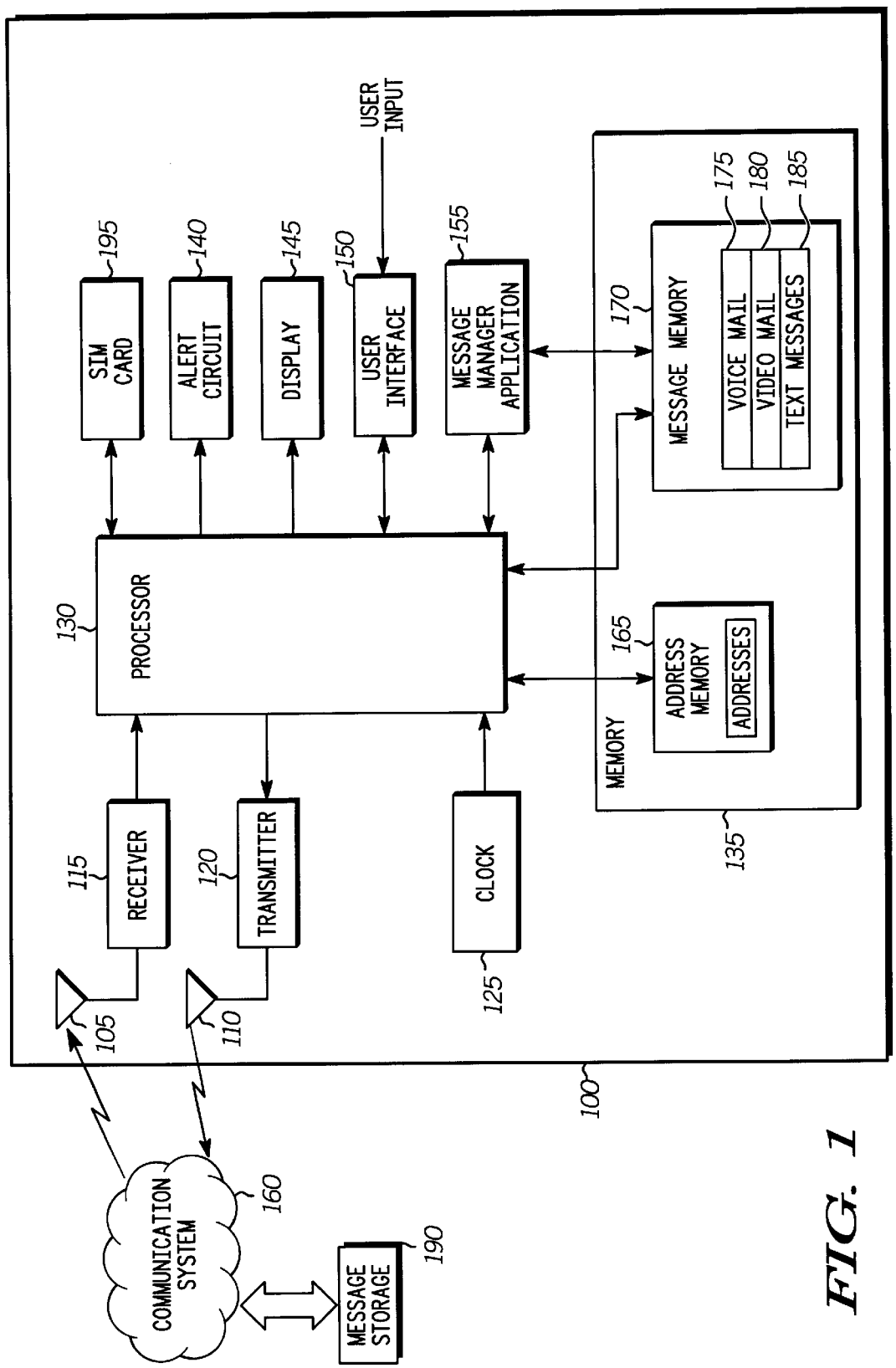
FIG. 1 is an electronic block diagram of a communication device.

Referring to FIG. 1, an electronic block diagram of a communication device 100 is shown. As illustrated in FIG. 1, the communication device 100 includes a first antenna 105, a second antenna 110, a receiver 115, a transmitter 120, a clock 125, a processor 130, a memory 135, an alert circuit 140, a display 145, a user interface 150 and a message manager application 155.

The first antenna 105 intercepts transmitted signals from a communication system 160. The first antenna 105 is coupled to the receiver 115, which employs conventional demodulation techniques for receiving the communication signals transmitted by the communication system 160. Coupled to the receiver 115, is the processor 130 utilizing conventional signal-processing techniques for processing received messages. Preferably, the processor 130 is similar to the MC68328 micro-controller manufactured by Motorola, Inc. of Schaumburg, Ill. It will be appreciated by one of ordinary skill in the art that other similar processors can be utilized for the processor 130, and that additional processors of the same or alternative type can be utilized as required to handle the processing requirements of the processor 130. The processor 130 decodes an address in the demodulated data of the received message, compares the decoded address with one or more addresses stored in an address memory 165 of the memory 135; and when a match is detected, proceeds to process the remaining portion of the received message.

To perform the necessary functions of the communication device 100, the processor 130 is coupled to the memory 135, which preferably includes a random access memory (RAM), a read-only memory (ROM), and an electrically erasable programmable read-only memory (EEPROM)(not shown). It will be appreciated by those of ordinary skill in the art that the memory 135 can be integrated within the communication device 100, or alternatively can be at least partially contained within an external memory such as a memory storage device 195. The external memory storage device 195, for example, can be a subscriber identification module (SIM) card mechanically interconnected to the communication device. A SIM card is an electronic device typically including a microprocessor unit and a memory suitable for encapsulating within a small flexible plastic card. The SIM card additionally includes some form of interface for communicating with an external device or system. The SIM card can be used to transfer a variety of information from/to the communication device 100 and/or any other compatible device. The memory 135 includes the address memory 165 and a message memory 170. It will be appreciated by one of ordinary skill in the art that the message memory 170 can be a voicemail box 175, a video mail box 180, a text message mail box 185, or a group of memory locations in a data storage device, or any combination therewith. In the following description, the term "message memory" refers to any of the memory means mentioned above or an equivalent. Once the processor 130 has processed one or more received messages, it can store the decoded message in the message memory 170 of the memory 135 when the device user desires such action.

Alternatively, a message storage 190 can be coupled to the communication system 160. When the device user desires to store one or more received but unanswered messages, the messages can be stored within the message storage 190 for later retrieval. It will be appreciated by one of ordinary skill in the art that the message storage 190 can be a voicemail storage, a video mail storage, a text message mail storage, or a group of memory locations in a data storage device, or any combination therewith.

Upon receipt and processing of a message or a call, the processor 130 preferably generates a command signal to the alert circuit 140 as a notification that the message has been received and stored or alternatively that a call is waiting for a response. The alert circuit 140 can include a speaker (not shown) with associated speaker drive circuitry capable of playing melodies and other audible alerts, a vibrator (not shown) with associated vibrator drive circuitry capable of producing a physical vibration, or one or more light emitting diodes (LEDs) (not shown) with associated LED drive circuitry capable of producing a visual alert. It will be appreciated by one of ordinary skill in the art that other similar alerting means as well as any combination of the audible, vibratory, and visual alert outputs described can be used for the alert circuit 140.

Upon receipt and processing of a message or a received call, the processor 130 preferably also generates a command signal to the display 145 to generate a visual notification of the receipt and storage of the message. When the display 145 receives the command signal from the processor 130 that the message has been received and stored in the memory 135 or alternatively that a call is awaiting a response, an indication is displayed. The indication, for example can be the activation of one of a plurality of icons on the display 135 or alternatively the activation of a notification message. The notification message, for example, can include the name, telephone number, or other identification of the calling party. The display 135 can be, for example, a liquid crystal display utilized to display text and graphics. It will be appreciated by one of ordinary skill in the art that other similar displays such as cathode ray tube displays, organic light emitting diodes, LEDs, or plasma displays can be utilized for the display 135.

The communication device preferably further includes the clock 125. The clock 125 provides timing for the processor 130. The clock 125 can include the current time for use in the operation of the communication device 100. The clock 125 also provides a source for timing of feature enhancements such as active and inactive periods of operation or periods of alerting. The clock 125 further can provide a source of timing for time-based preferences used by the message manager application 155.

In a preferred embodiment, the communication device includes the message manager application 155. The message manager application 155 can be hard coded or programmed into the communication device 100 during manufacturing, can be programmed over-the-air upon customer subscription, or can be a downloadable application. It will be appreciated that other programming methods can be utilized for programming the message manager application 155 into the communication device 100. It will be further appreciated by one of ordinary skill in the art that the message manager application 155 can be hardware circuitry within the communication device 100.

The message manager application 155 operates using a plurality of user preferences which can be manually set by the user of the communication device 100, or can be preprogrammed into the communication device 100. Preferably, the plurality of user preferences can be changed as desired by the user of the communication device 100. The plurality of user preferences preferably includes an automatic line switch back feature. In one mode, the message manager application 155 can operate to restore the active communication line automatically to a previously active line when this feature is activated. In a second mode, the message manager application 155 can determine the desired active line and restore an active communication line by prompting the user for a user input. When the user input indicates a desire to restore a previously active communication line, the message manager application 155 can restore the line. Otherwise, a currently active line can remain as the active communication line. It will be appreciated by those of ordinary skill in the art that any combination of automatic and manual operation of the message manager application 155 is within the scope of the present invention.

Preferably, the user interface 150 is coupled to the processor 130. The user interface 150 can be one or more buttons used to generate a button press, a series of button presses, a voice response from the device user, or some other similar method of manual response initiated by the device user of the communication device 100. The processor 130, in response to receiving a user input via the user interface 150, such as a device user depressing a button or series of buttons, or in response to receipt of a message, initiates a user input signal to the message manager application 155. The message manager application 155, in response to the user input signal, accesses the message memory 170 and provides the device user with information relating to the various stored messages within the message memory 170. As previously described, the information can be either displayed on the displayed, alerted, or equivalently indicated to the device user.

The transmitter 120 is coupled to the processor 130 and is responsive to commands from the processor 130. When the transmitter 120 receives a command from the processor 130, the transmitter 120 sends a signal via the second antenna 110 to the communication system 160.

In an alternative embodiment (not shown), the communication device 100 includes one antenna performing the functionality of the first antenna 105 and the second antenna 110. Further, the communication device 100 alternatively includes a transceiver circuit (not shown) performing the functionality of the receiver 115 and the transmitter 120. It will be appreciated by one of ordinary skill in the art that other similar electronic block diagrams of the same or alternate type can be utilized for the communication device 100.

FIG. 2 illustrates a multi-line message memory 200 for use within the communication device 100 of FIG. 1. The multi-line message memory 200, for example, can be utilized when the communication device 100 has capability for communication over multiple channels, telephone lines, communication systems, and the like. As illustrated, the multi-line message memory 200 can include separate memory locations for storage of messages associated with each of a plurality of communication lines. The multi-line message memory 200 can be divided into distinct memory storage locations associated with each communication line. For example, each Nth line 205 has associated memory storage locations for storage of received voicemails 210, video mails 215, text messages 220, and the like. Thus, a voicemail received on line 1 would be stored in a voicemail 1 memory storage location 225, a video mail received on line 1 would be stored in a video mail 1 memory storage location 230, and a text message received on line 1 would be stored in a text messages 1 memory storage location 235. Similarly, a voicemail received on line 2 would be stored in a voicemail 2 memory storage location 240, a video mail received on line 2 would be stored in a video mail 2 memory storage location 245, and a text message received on line 2 would be stored in a text messages 2 memory storage location 250 a voicemail received on line 1 would be stored in a voicemail 1 memory storage location 225, a video mail received on line 1 would be stored in a video mail 1 memory storage location 230, and a text message received on line 1 would be stored in a text messages 1 memory storage location 235.

FIG. 3 illustrates one embodiment of the operation of the communication device 100 in accordance with the present invention. Specifically, FIG. 3 illustrates one embodiment of the operation of the communication device 100 for processing received messages. The process begins with Step 300 in which the communication device receives a new message. It will be appreciated by those of ordinary skill in the art that the received messages can be voicemail messages, video mail messages, text messages, and the like. Next, in Step 305, the user is notified via a message indicator of the received message (s). For example, as illustrated in FIG. 4, a message indicator 405 can be displayed on a display 400 to alert the user that there are received and stored messages. Similarly, any combination of audible, vibratory, and visual alert outputs can be initiated by an alert circuit to notify the user of the received and stored messages. Referring back to FIG. 3, next in Step 310, a device user initiates a user input to the message mailbox. For example, when the communication device includes a touch pad display, the device user can initiate an input to the message mailbox by tapping on the message indicator 405. It will be appreciated that other user inputs and/or combinations of user inputs can be utilized in accordance with the present invention. Next, in Step 315, the message mailbox is accessed. The message mailbox, for example, can be at least a portion of an internal memory or an external message storage memory connected to the communication device, as described previously herein.

Figure 5:
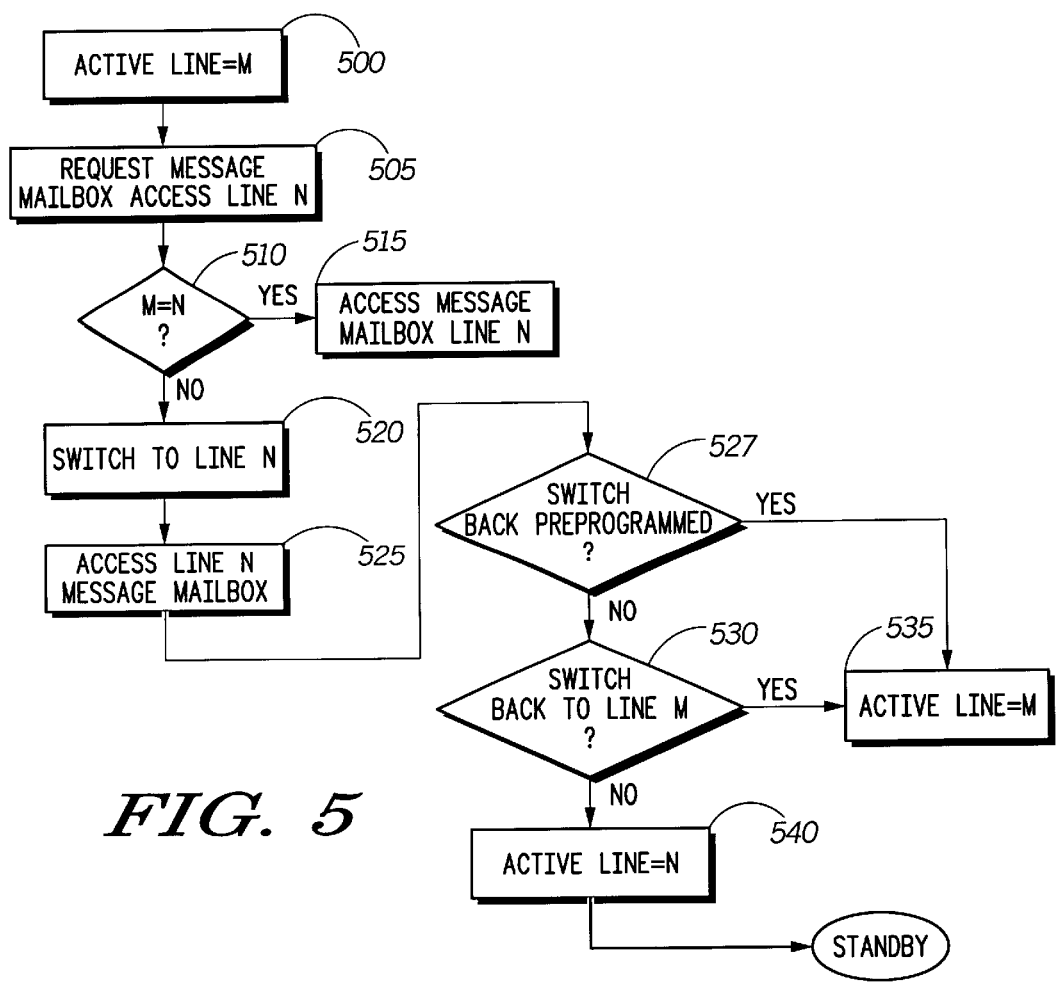
Figure 6:
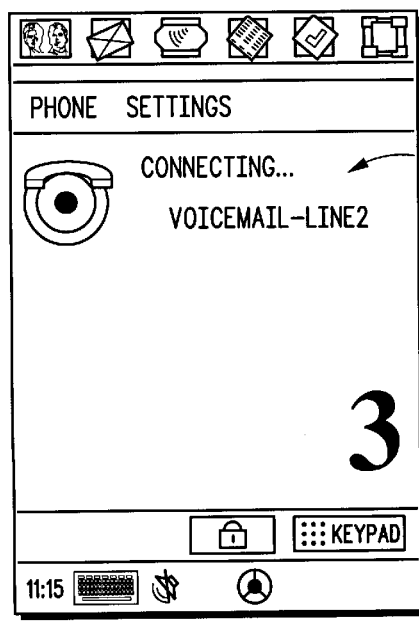
Figure 7:
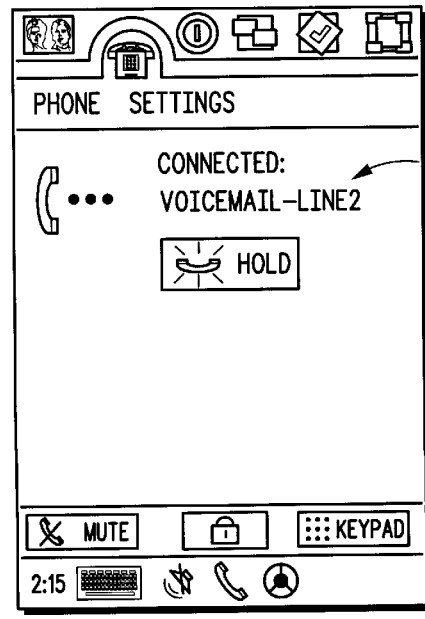
Figure 8:
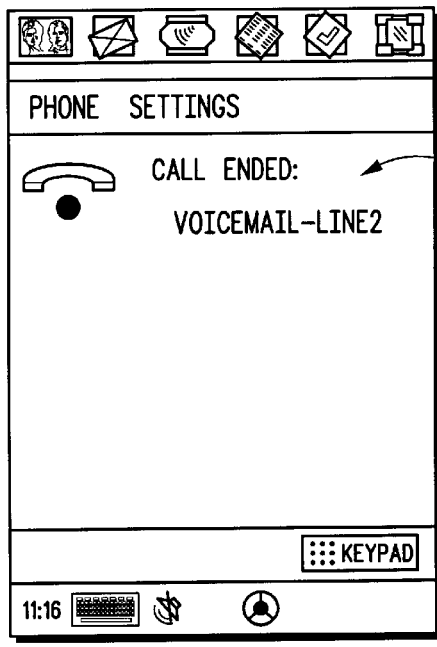

FIG. 5 illustrates one embodiment of the operation of the communication device 100 in accordance with the present invention. Specifically, FIG. 5 exemplifies one embodiment of the operation of the message manager application incorporated within the communication device 100 for dynamic message memory access when the communication device is capable of operating on a plurality of communication channels or lines. Beginning with Step 500, the active line is set to a parameter M. The active line is the current identified active communication channel. For example, when the communication device operates on two different telephone number lines, the active line can be either the first line or the second line. Next, in Step 505, the message manager application receives a user input requesting message mailbox access on an Nth line. Next in Step 510, the message manager application determines whether the Nth line is the active line M. In Step 515, when the Nth line upon which the request for message access is directed and the Mth active line are the same, the communication device accesses the message mailbox directly for the Nth line. FIG. 6 illustrates a display 600 including a connecting notification 605 indicating connecting to a line 2 voicemail. FIG. 7 illustrates a display 700 including a connected notification 705 indicating that the device is connected to line 2 voicemail. When the device user completes the message access of the Nth line, the connection is terminated. FIG. 8 illustrates a display 800 including a call ended notification 805.

Referring back to FIG. 5, in Step 520, when the Nth line and the Mth line differ, the message manager application switches the active line to the Nth line. For example, the request can be for accessing voicemails on a first telephone line while the current active telephone line for communication is a second telephone line. The message manager application can automatically cause the communication device to switch the active line to the first telephone line transparently to the device user. The device user can be notified as illustrated in FIGS. 6 and 7 herein. Next, in Step 525, the device user gets access to the Nth line message mailbox similar to as discussed previously for Step 515. When the device user completes the message access of the Nth line, the connection is terminated. FIG. 8 illustrates a display 800 including a call ended notification 805.

Next, in Step 527, it is determined whether or not the switch back feature has been preprogrammed. For example, the communication device 100 can include a programmable feature for automatic line switch back. The programmable feature can be manually set by the user via a user input, can be preprogrammed into the communication device when manufactured, programmed by the service provider, or any other equivalent method for setting the automatic line switch back feature. The automatic line switch back feature provides for automatically switch the active line back to the previously active line after the message mailbox has been accessed. When the automatic line switch back feature is determined to be activated in Step 527, the process moves next to Step 535 wherein the active line is returned to the original active line=M.

Figure 9:
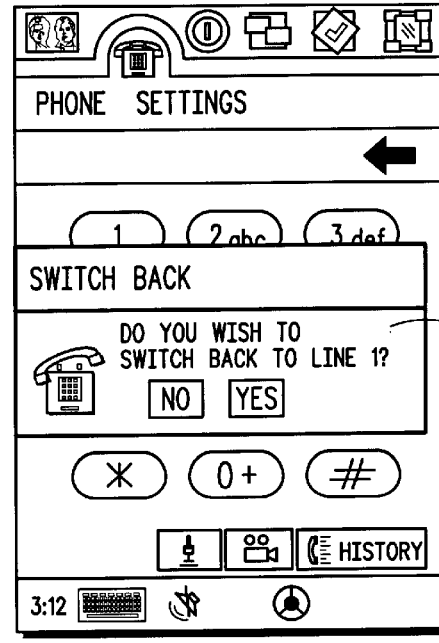
Figure 10:
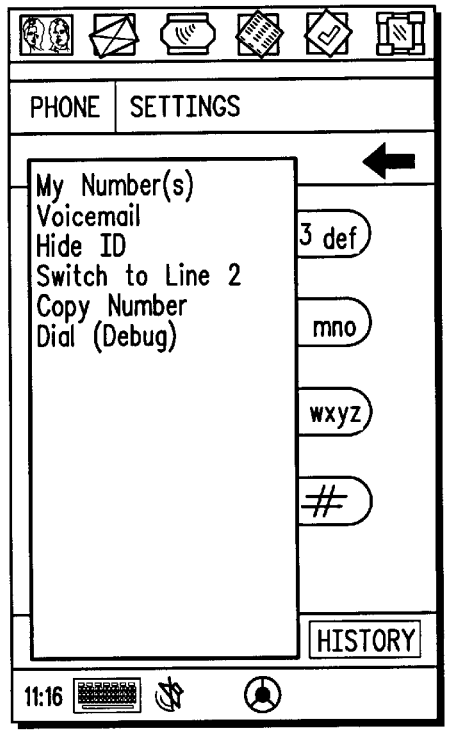
Figure 11:
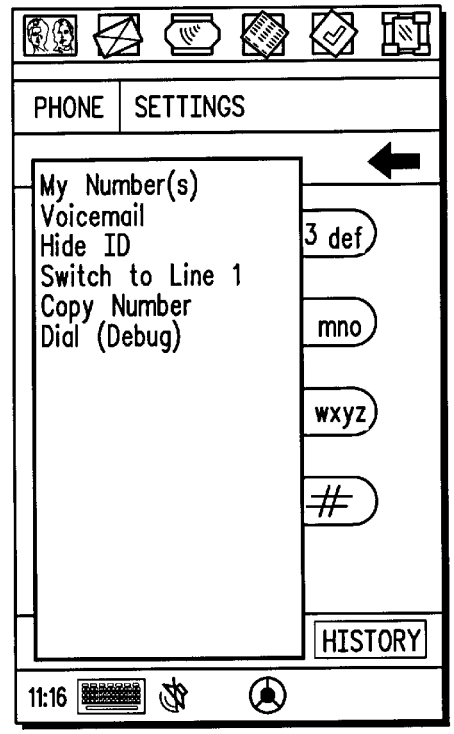

When the automatic line switch back feature is not activated in Step 527, the process goes to Step 530, in which the message manager application determines whether the device user requires or desires the Nth line to remain as the active line or alternatively the device user requires or desires the active line to switch back to the original Mth line. For example, an input pop-up box 905 can be displayed on a display 900 as illustrated in FIG. 9. The device user can be given the option to choose the active line. In Step 535, when the device user chooses to switch the active line back to the Mth line, the current active line is automatically switched back to the Mth line without any further action from the device user. FIG. 10 illustrates one example of a display when line 1 is the active line. In Step 540, when the device user chooses for the active line to remain as the Nth line, no further action is taken and the active line remains as the Nth line. FIG. 11 illustrates an example of a display when the active line is line 2. Thereafter, the communication device returns to standby mode awaiting the next communication or user input.

The communication device, message manager application and processes discussed above and the inventive principles thereof are intended to provide meaningful information with regards to automatic message access for multiple communication lines. It is expected that one of ordinary skill given the above described principles, concepts and examples will be able to implement other alternative procedures that are communications device dependent and that will also offer additional quick and efficient processes and systems for multiple-line message access. It is anticipated that the claims below cover many such other examples.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A communication device operating within a communication system, the communication device comprising:
   a processor for processing communications on more than one communication line;
   a multi-line message memory coupled to the processor including a memory storage location for each of the one or more communication lines;
   a message manager application coupled to the processor and to the multi-line message memory for operating the communication device using the one or more communication lines, wherein the message manager application is programmed to:
   cause the communication device to operate using a first communication line as an active communication line,
   switch the active communication line to a second communication line,
   access a second memory storage location associated with the second communication line within the multi-line message memory, and
   switch the active communication line to the first communication line when the access of the second memory storage location is completed.

2. A communication device as recited in claim 1 wherein the multi-line message memory includes one or more message storage devices chosen from the group consisting of an internal memory, an external memory storage device mechanically interconnected to the communication device, and a message storage coupled to the communication device within the communication system.

3. A communication device as recited in claim 1 wherein the multi-line message memory comprises one or more message storage devices chosen from the group consisting of a voicemail storage, a video mail storage, and a text message mail storage.

4. A communication device as recited in claim 1 further comprising:
   a plurality of user preferences, wherein the message manager application operates using the plurality of user preferences.

5. A communication device as recited in claim 4 wherein the plurality of user preferences includes an automatic line switch back feature, and further wherein the message manager application automatically switches the active communication line to the first communication line when the automatic line switch back feature is set to a first mode.

6. A communication device as recited in claim 4 wherein the plurality of user preferences includes an automatic line switch back feature, and further wherein the message manager application prompts a user for a user input and receives the user input prior to switching the active communication line to the first communication line when the automatic line switch back feature is set to a second mode.

7. A method for multi-line message memory access within a communication device comprising:
   communicating on a first active communication line;
   receiving one or more messages on a second active communication line;
   activating a notification of the received one or more messages;
   accessing a message mailbox associated with the second active communication line device; and
   reactivating communication on the first active communication line.

8. A method for multi-line message memory access as recited in claim 7 further comprising:
   activating communication on the second active communication line prior to the accessing step.

9. A method for multi-line message memory access as recited in claim 7 further comprising:
   providing a user input to the message mailbox prior to the accessing step.

10. A method for multi-line message memory access within a communication device comprising:
    communicating on an active communication line, wherein the active communication line is a first communication line;
    receiving a user input requesting message mailbox access on a second communication line;
    switching the active communication line to the second communication line;
    accessing the second communication line message mailbox; and
    restoring the active communication line back to the first communication line.

11. A method for multi-line message memory access as recited in claim 10 further comprising:
    activating a prompt for switching of the active communication line; and
    receiving a confirmation user input prior to the switching step.

12. A method for multi-line message memory access as recited in claim 10 further comprising:
   activating a prompt for switching back of the active communication line; and
   receiving a confirmation user input prior to the restoring step.

* * * * *